Aug. 16, 1927.
E. F. ANDERSON
1,639,447
STRAW SPREADER
Filed March 1, 1922
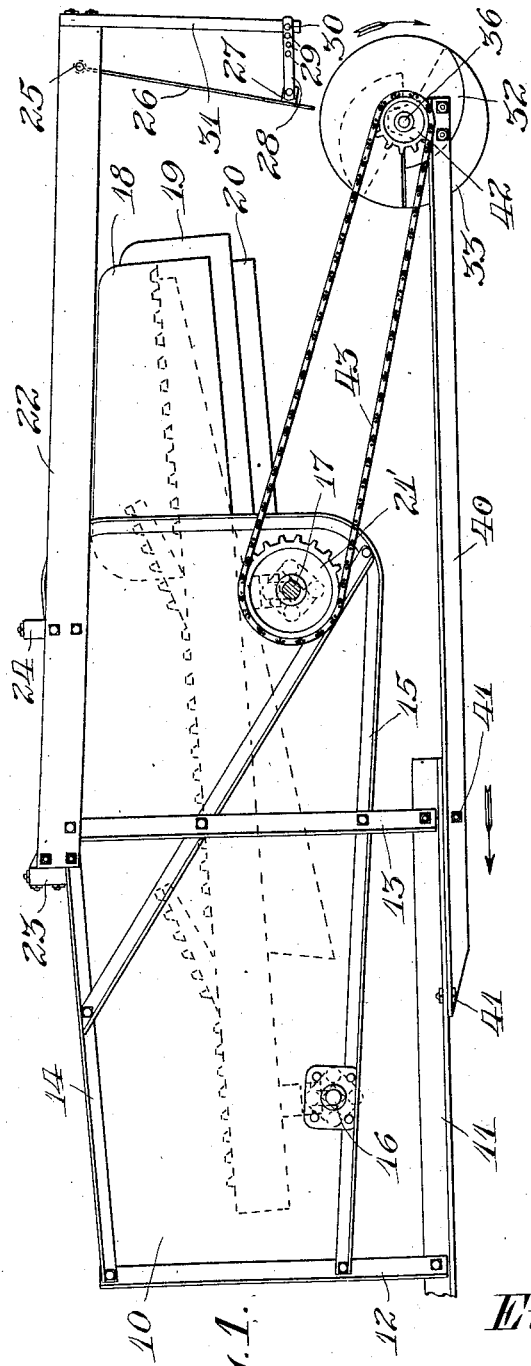
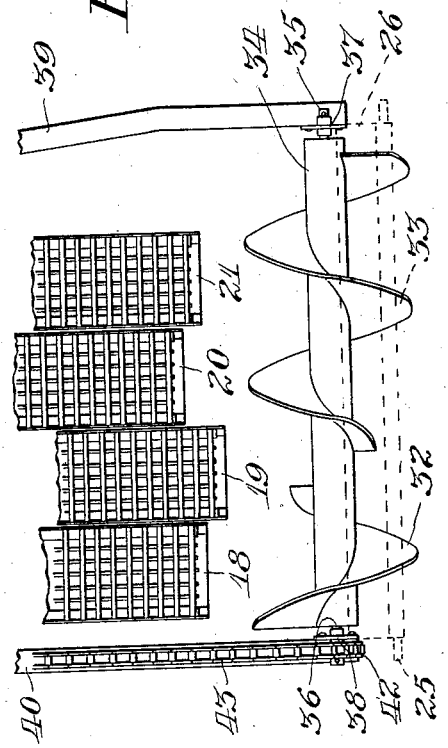
Inventor.
Emil F. Anderson,
By H. P. Doolittle,
Atty.

Patented Aug. 16, 1927.

1,639,447

UNITED STATES PATENT OFFICE.

EMIL F. ANDERSON, OF CHICAGO, ILLINOIS, ASSIGNOR TO INTERNATIONAL HARVESTER COMPANY, OF CHICAGO, ILLINOIS, A CORPORATION OF NEW JERSEY.

STRAW SPREADER.

Application filed March 1, 1922. Serial No. 540,159.

This invention relates to straw spreaders and more particularly to a straw spreading attachment adapted to be connected to a harvester thresher for spreading straw.

One of the objects of the present invention is to provide a device of a particular construction adapted to cooperate with the straw walkers or reciprocating conveyers of the harvester thresher in such a manner as to evenly distribute the straw over a wide area.

A further object is to provide an adjustable deflector for use in connection with the distributor so that the straw will be directed at a point on the distributor which will effect a wide spread of the straw.

These and other objects are attained by providing a construction and arrangement of the various parts whereby the objects contemplated are attained, as hereinafter more fully set forth, pointed out in the claim and illustrated in the accompanying drawings in which:

Fig. 1 is a side elevational view of the rear end of a harvester thresher embodying my improved straw spreading attachment; and Fig. 2 is a top plan view of Fig. 1 showing the relative positions of the deflector and distributor with reference to the reciprocating conveyers.

Referring to the drawings illustrating the preferred construction of my improved straw distributing attachment, this device is shown embodied in a harvester thresher 10. The harvester, only part of which is shown, in this instance comprises the usual rearwardly extending main frame member 11. Extending upwardly from and fixed to the frame member 11, are vertical side angles 12 and 13. Mounted on these side angles are the upper and lower separator frame members 14 and 15 which form the usual siding for the separator proper of the harvster thresher. Mounted on the usual forward and rearward crank shafts 16 and 17 respectively are the reciprocating walkers or conveyers 18, 19, 20 and 21. The crank shaft 17 has securely fixed adjacent one end, a sprocket 21' for the purpose hereinafter set forth.

My improved straw spreading attachment comprises a pair of longitudinally extending frame members 22 (only one of which is shown) fixed to the upper part of the separator proper by being secured by means of cross bars 23 and 24 to the top members 14. Pivotally mounted adjacent the rear end of the longitudinally extending members 22 by means of a rod 25 is a deflector 26. Fixed adjacent the free end of the deflector 26 are brackets 27. Pivotally connected to these brackets are adjustable links 28 provided with a series of apertures 29 adapted to receive a bolt 30 for adjustably securing the deflector 26 in its proper position to the depending arm 31 secured to the member 22.

My improved spiral distributor comprises two oppositely disposed spirals 32 and 33 fixed to the wood roller 34 which in turn is pivotally supported beneath the deflector 26 by means of studs 35 and 36 mounted in the bearings 37 and 38 respectively. The bearings 37 and 38 are securely fixed to the rearwardly extending supports 39 and 40 which are fixed to the main frame angles 11 by means of bolts 41. The spiral 33 extends substantially from the left of a medial line of the reciprocating conveyers to and beyond the conveyer 20 or, in other words, the spiral conveyer 33 extends from the center of the reciprocating conveyer 19 to and beyond the conveyer 21 while the spiral 32 extends from the center of the conveyer 19 to and beyond the conveyer 18.

From this construction it will be noted that the spiral distributor 33 which distributes the straw to the right of this attachment as the machine travels in the direction indicated by the arrows in Figure 1 distributes the greater portion of the straw conveyed from these conveyers.

Securely fixed to one end of the stud 36 is a sprocket 42 which is geared to the sprocket 21' by means of a flexible chain 43.

In the operation of this device it will be understood that the reciprocating conveyers 18, 19, 20 and 21 and the crank shafts 16 and 17 are driven in the usual manner from the traction wheels of the harvester, and as the grain is threshed, the straw is delivered upon the reciprocating walkers or conveyers 18, 19, 20 and 21 and distributed onto the deflector 26 which in turn directs the straw onto the oppositely disposed spiral distributors 32 and 33. These in turn are revolved in the direction indicated by the arrow through the gearing mechanism including the sprockets 21', 42 and chain 43 to the crank shaft 17. It has been found from experience in harvester threshers of the type now in general use that a major portion of the straw is delivered over the reciprocating conveyers at a point to one side of the medial line of the conveyers. In this case the bulk of the straw is conveyed over the walker 19 and accordingly the spirals 32 and 33 are thus constructed to evenly distribute the straw.

While I have shown and described this device as an attachment to a harvester thresher, it will be understood that the reciprocating conveyers in combination with the spiral distributors and deflector may be used together as an attachment for distributing fertilizer or the like by using any well known conveying means for conveying the material from a load to the reciprocating conveyers and thus a very efficient device is provided for breaking up the lumps which otherwise would not be broken up.

While I have described in the above specification one embodiment of my invention, it should be understood that the invention is capable of modifications and that modification and changes in the construction and in the arrangement of the cooperating parts may be made without departing from the spirit and scope of the invention as expressed in the following claim:

The combination with a harvester thresher having a frame carrying a grain and straw separator, of a straw spreading attachment therefor comprising a pair of oppositely pitched spiral spreading members arranged on a tranverse shaft journaled on said frame in a position to receive the straw from the separator, one of said spreading members being of greater length than the other so that it extends across the longitudinal medial line of the separator.

In testimony whereof I affix my signature.

EMIL F. ANDERSON.